(12) United States Patent
Kim

(10) Patent No.: US 12,103,193 B2
(45) Date of Patent: Oct. 1, 2024

(54) MULTIPURPOSE CUTTER TABLE

(71) Applicant: Jinman Kim, Gwangju-si (KR)

(72) Inventor: Jinman Kim, Gwangju-si (KR)

( * ) Notice: Subject to any disclaimer, the term of this patent is extended or adjusted under 35 U.S.C. 154(b) by 195 days.

(21) Appl. No.: 17/785,672

(22) PCT Filed: Dec. 15, 2020

(86) PCT No.: PCT/KR2020/018346
§ 371 (c)(1),
(2) Date: Jun. 15, 2022

(87) PCT Pub. No.: WO2021/125743
PCT Pub. Date: Jun. 24, 2021

(65) Prior Publication Data
US 2023/0056013 A1 Feb. 23, 2023

(30) Foreign Application Priority Data
Dec. 17, 2019 (KR) .................. 10-2019-0168939

(51) Int. Cl.
*B27B 5/16* (2006.01)
*B27B 5/22* (2006.01)

(52) U.S. Cl.
CPC .............. *B27B 5/165* (2013.01); *B27B 5/222* (2013.01)

(58) Field of Classification Search
CPC .... B25H 1/10; B25H 1/04; B25H 1/00; B27B 5/165; B27B 5/222; B23D 47/025; B23D 47/02
(Continued)

(56) References Cited

U.S. PATENT DOCUMENTS 4,133,360 A * 1/1979 Sanfilippo ............ B23Q 9/0092
83/477.2
4,184,667 A * 1/1980 Alessio ..................... B25B 1/02
269/154
(Continued)

FOREIGN PATENT DOCUMENTS

EP 3372751 A1 * 9/2018 ............... B25H 1/04
JP H07-069115 A 3/1995
(Continued)

OTHER PUBLICATIONS

KR 101515563 B1, Translation (Year: 2024).*

*Primary Examiner* — Nhat Chieu Q Do
(74) *Attorney, Agent, or Firm* — KORUS Patent, LLC; Seong Il Jeong

(57) ABSTRACT

A multipurpose cutter table comprises a table member having a long hole in which a saw blade is installed; a pair of leg members foldably installed on a bottom surface of the table member and supporting the table member; a pair of side supporting members installed to be adjustable in length on both sides of the table member and to support a cutting object on both sides of the table member; and an upper surface supporting member foldably installed on an upper surface of the table member and installed so that the cutting object is placed on the upper surface of the table member. Accordingly, a cutting object longer than the table member can be stably placed by the side supporting member, the height of the horizontal fixed frame can be freely adjusted, and a huge working space placing a cutting object before and after cutting can be obtained.

3 Claims, 9 Drawing Sheets

(58) Field of Classification Search
USPC .......................................................... 83/477
See application file for complete search history.

(56) References Cited

U.S. PATENT DOCUMENTS

| | | | |
|---|---|---|---|
| 4,911,418 A * | 3/1990 | Dennis | B25H 1/00 |
| | | | 269/71 |
| 5,782,279 A | 7/1998 | Stecker, Sr. | |
| 2017/0312908 A1 | 11/2017 | Judge | |
| 2020/0054125 A1 * | 2/2020 | Robinson | A47B 96/028 |

FOREIGN PATENT DOCUMENTS

| | | | | |
|---|---|---|---|---|
| JP | 2004-058330 A | 2/2004 | | |
| KR | 10-0796674 B1 | 1/2008 | | |
| KR | 10-1027241 B1 | 4/2011 | | |
| KR | 101273738 B1 * | 6/2013 | | B27B 29/00 |
| KR | 101515563 B1 * | 5/2015 | | |
| KR | 20-0478122 Y1 | 8/2015 | | |
| KR | 10-2018-0122774 A | 11/2018 | | |
| KR | 10-1953360 B1 | 5/2019 | | |
| KR | 10-2019-0091168 A | 8/2019 | | |
| WO | WO-03088782 A2 * | 10/2003 | | A47B 57/06 |

\* cited by examiner

MULTIPURPOSE CUTTER TABLE

CROSS-REFERENCE TO RELATED APPLICATION

This application is a national stage application, filed under 35 U.S.C. § 371, of International Patent Application No. PCT/KR2020/018346, filed on Dec. 15, 2020, which claims the benefit of KR Patent Application No. 10-2019-0168939, filed Dec. 17, 2019, each of which is incorporated by reference herein in its entirety.

FIELD OF THE INVENTION

The present invention relates to a multipurpose cutter table, and more particularly, to a multipurpose cutter table in which legs and materials supporting the table can be placed on a shelf and the shelf can be freely folded or unfolded.

BACKGROUND OF THE INVENTION

In general, a wood cutting device is a device for cutting wood using a circular saw rotated by power. When wood or plywood is pushed into the rotating circular saw, it can be cut to a desired length and size as needed. That is, the cutting device for cutting wood or plywood to a desired size refers to a machine tool capable of cutting a workpiece while a circular saw is usually rotated.

This conventional wood cutting device is supported by a plurality of support parts configured in the lower portion and is configured to include a workbench having a slit hole and a rotating circular saw a portion of which is protruded toward the upper portion of the slit hole of the workbench. The wood, such as lumber or plywood, passing through the workbench is cut by the portion of the circular saw protruding from the upper portion of the slit hole.

In addition, since it is difficult to carry a bulky workbench and cannot be used at a work site, a portable cutter that can be easily carried by a worker is being used. This portable cutting machine is configured with a handle that can be gripped by a worker on one side of the circular saw, and it can cut wood by pressing the handle and lowering the circular saw in a state where the wood is close to the lower portion of the circular saw.

These conventional wood cutting devices do not have much difficulty in cutting wood vertically. However, if a cutting angle of wood is inclined instead of a vertical direction, a workbench is needed to be installed in an inclined direction, or a separate cutting device capable of inclined cutting is needed.

In order to cut a processing object such as wood at an arbitrary angle, a multifunctional cutting machine is known, which includes a body having a base with a fence on which a workpiece is placed and a turn table that is rotatable to the base; and a cutting portion supported by the turn table and having a saw blade rotating according to a motor.

In order to set the saw blade to an arbitrary cutting angle of this multifunctional cutting machine, the first step is to rotate a car steering wheel installed in the front of the turntable with respect to the base to move the turntable to a desired angle position.

Then, by rotating the car steering wheel to a fixed position, so that the front end of a shaft connected to one end thereof is in contact with the base. Since the turntable is fixed with respect to the base, unexpected movement of the turntable is prevented.

However, if the car steering wheel is excessively tightened to ensure the turntable to be fixed to the base, the shaft excessively hits the base, thereby leading to deformation or damage of the base.

For example, the following Patent Document 1 discloses 'Wood Cutting Device Capable of Adjusting Cutting Angle.'

The wood cutting device capable of adjusting a cutting angle according to the following Patent Document 1 is configured to comprise: a base frame supported by a support frame configured on the lower portion and having a saw blade guide groove recessed along the inner surface in a horizontal direction; a support bracket configured on the top surface of the base frame in a vertical direction; two horizontal support rods each extended from one side toward the horizontal direction of the base frame; a moving bracket that is axially installed on the two horizontal support rods and moves in a left or right direction on the two horizontal support rods; a circular saw bracket coupled to the front surface of the moving bracket; and a circular saw having a rotating shaft that is axially installed and fixed to the circular saw bracket formed at the upper portion and positioned on the saw blade guide groove of the base frame.

The wood cutting device may further comprise: a first angle adjusting body configured to be welded to the front surface of the rotating shaft axially installed and fixed to the circular saw bracket and to adjust a cutting angle of the circular saw by tilting the cutting angle of the circular saw from a vertical angle to a horizontal angle; and a second angle adjusting body adjusting a cutting angle of a workpiece to be cut by the circular saw, by riding on the upper surface of the base frame and entering toward the circular saw, wherein the first angle adjusting body includes a control plate having one rear surface welded to the front surface of the rotating shaft axially installed and fixed to the circular saw bracket by welding; and an angle adjusting groove penetrating on the upper portion of the inner portion of the control plate and formed in a semicircular shaped through hole.

The first angle adjusting body includes: a guide groove positioned on the lower portion of the angle adjusting groove and having a through hole in a semicircular shape; an angle adjusting protrusion having one side coupled and fixed to the circular saw and the other side that passes through the angle adjusting groove and has a screw fastening portion formed on the outer surface thereof; a guide protrusion that is coupled and fixed to one side of the circular saw so as to be positioned on the lower portion of the angle adjusting protrusion fixed to one side of the circular saw and is inserted into the guide groove and guided; and a fixing nut screwed to the angle adjusting protrusion penetrating from the angle adjusting groove.

The second angle adjusting body includes: a fixing hole penetrating through the upper surface of the base frame; a plurality of angle adjusting holes positioned radially in a semi arc shape with respect to the fixing hole and provided through the upper surface of the base frame; and an angle adjusting bar in which a fixed shaft fitted into the fixing hole protrudes on the lower surface, an angle adjusting shaft fitted into any one of the angle adjusting holes protrudes on the lower surface, and a guide piece is bent and extended vertically to the upper surface.

The following Patent Document 2 discloses 'Movable Table Device for Bookbinding Perforator.'

The movable table device for a bookbinding perforator according to the following Patent Document 2 is installed on a base plate and a lower body of the bookbinding perforator and is controlled by the control unit of the bookbinding perforator to assist perforating and bookbinding work of the bookbinding perforator for a plurality of stacked print products.

The work plate includes: a work hole for perforating and bookbinding of the bookbinding perforator; and a first contact end formed in a protruding shape to be in close contact with one side of a plurality of stacked print products on both sides of the work hole. Inside the housing, a driving motor is installed to be controlled by a control unit of the bookbinding perforator and have first gear provided on a rotating shaft; a screw shaft is installed to have a second gear engaged with the first gear and rotating; and a moving member is installed to move along the screw shaft by rotation of the screw shaft.

A moving hole is formed through which the moving member can move on the outer surface of the housing, and a table provided with a fixing rack fixing both adjacent sides of a plurality of stacked print products is installed in the moving member. In addition, guide rods are installed on both sides of the fixing rack on the outside of the table, and a pressing member is installed on the guide rods. The pressing member is guided in upward and downward directions by the guide rods and fixes the stacked print products by pressing the upper surface of the plurality of print products stacked on the table.

A fixing member is installed in the guide rods and the pressing member to fix and release the pressing member to the guide rods, and guide holes guided to the guide rods are formed on both sides of the pressing member. Around the guide holes, a first and a second locking hole are formed. A third locking hole to which the fixing member is locked when it is guided to the guide rods or tilted in one direction is formed on one side, and the first and the second fastening hole communicating the first and the second locking hole are formed on the opposite side.

The device further comprises: a fixing plate in which a bent portion is formed to be bent between the third locking hole and the first and second fastening hole; and a fixture having one side is fastened to the first and second fastening hole of the fixing plate, the opposite side passing through the first and second locking hole of the pressing member, and a first separation preventing part that prevents from being separated by being caught around the first and second locking hole and provided on the opposite side.

(Patent Document 1) Korean Patent No. 10-1027241
(Patent Document 2) Korean Patent No. 10-1953360
(Patent Document 3) Korean Patent No. 10-2019-0091168

DETAILED DESCRIPTION OF THE INVENTION

Technical Problems

An object of the present invention is to solve the problems described above and to provide a multipurpose cutter table that allows a cutting object to be placed on either a left portion or a right portion of the table regardless of the size of the cutting object as well as to be stably placed.

Another object of the present invention is to provide a multipurpose cutter table that allows a material or a cutting object to be stably placed on both sides of the upper surface of the table, respectively.

SUMMARY OF THE INVENTION

In order to achieve the object mentioned above, a multipurpose cutter table according to the present invention comprises: a table member 100 having a long hole in which a saw blade is installed; a pair of leg members 200 that are foldably installed on a bottom surface of the table member 100 and support the table member 100; a pair of side supporting members 300 installed so as to be adjustable in length on both sides of the table member 100 and to support a cutting object on both sides of the table member 100; and an upper surface supporting member 400 that is foldably installed on an upper surface of the table member 100 and installed so that the cutting object is placed on the upper surface of the table member 100.

The leg members 200 may include: a first leg member 210 supporting one side of the table member 100; and a second leg member 220 supporting the other side of the table member 100, wherein each of the first leg member 210 supporting and the second leg member 220 includes: a vertical frame 230 formed in an H shape; and a fixed frame 240 fixed to a bottom surface of the table member 100 so as to be folded or unfolded by rotating the vertical frame 230.

The side supporting member 300 may include: a quadrangle frame 310 fixed to a bottom surface of the table member 100; a horizontal moving frame 320 coupled to be horizontally movable along an inner surface of the quadrangle frame 310; a vertical moving frame 330 coupled to a front end of the moving frame 320 in a vertical direction and movably coupled to the moving frame 320 in a vertical direction; and a horizontal fixed frame 340 fixed to an upper surface of the vertical moving frame 330 in a direction crossing the horizontal moving frame 320 so that the cutting object can be placed thereon.

The upper surface supporting member 400 may include: a first vertical member 410 installed on one side of the table member 100; a second vertical member 420 installed on the other side of the table member 100; a hinge member 430 installed on the upper surface of the table member 100 so that the first vertical member 410 and the second vertical member 420 are rotatably installed thereon; a first horizontal member 440 installed so as to be adjustable in height to be at a predetermined height of the first vertical member 410 and the second vertical member 420; and a second horizontal member 450 installed so as to be adjustable in height above an upper portion of the first horizontal member 440.

Each of the first horizontal member 440 and the second horizontal member 450 may include: a fixed frame 461 fixed to a front surface of the first vertical member 410 and the second vertical member 420; a first rotating frame 462 that is rotatably installed on an upper portion of the fixed frame 461; and a second rotating frame 463 rotatably coupled to a lower portion of the fixed frame 461 and seated on a lower surface of the first rotating frame 462.

Technical Effects of the Invention

As described above, according to the multipurpose cutter table of the present invention, a cutting object longer than the length of the table member can be stably placed by the side supporting member, the height of the horizontal fixed frame can be freely adjusted, and a huge working space placing a cutting object before and after the cutting operation can be obtained.

In addition, according to the multipurpose cutter table according to the present invention, since the leg member and the upper surface supporting member can be folded, the table member can be easily stored and can be used regardless of a work site.

MODES FOR THE INVENTION

Hereinafter, a multipurpose cutter table according to a preferred embodiment of the present invention will be described in detail with reference to the accompanying drawings.

The multipurpose cutter table according to a preferred embodiment of the present invention comprises: a table member 100 having a long hole in which a saw blade is installed; a pair of leg members 200 that are foldably installed on a bottom surface of the table member 100 and support the table member 100; a pair of side supporting members 300 installed so as to be adjustable in length on both sides of the table member 100 and to support a cutting object on both sides of the table member 100; and an upper surface supporting member 400 that is foldably installed on an upper surface of the table member 100 and installed so that the cutting object is placed on the upper surface of the table member 100.

Figure 1:
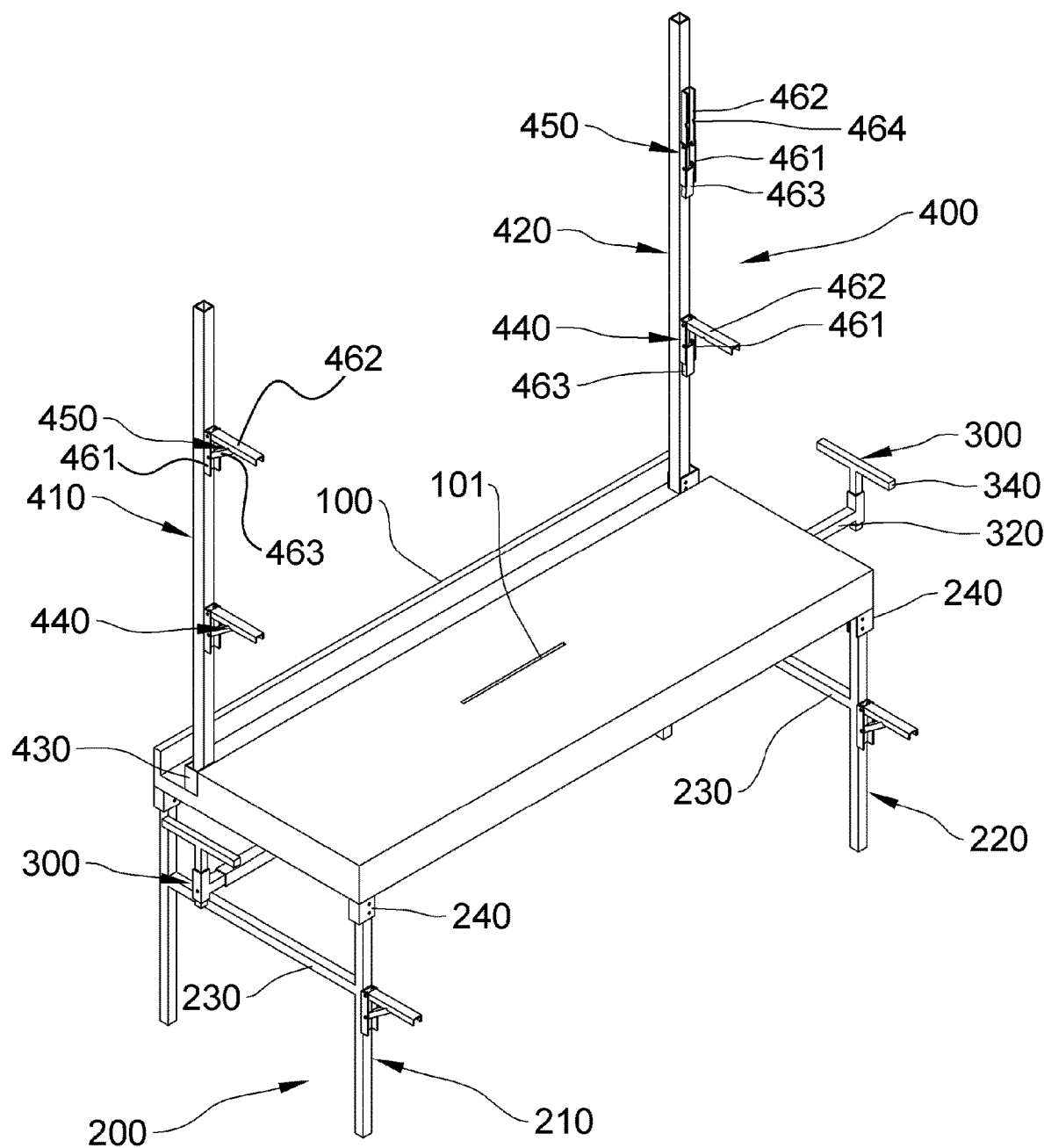
FIG. 1 is a perspective view illustrating a multipurpose cutter table according to a preferred embodiment of the present invention.
Figure 2:
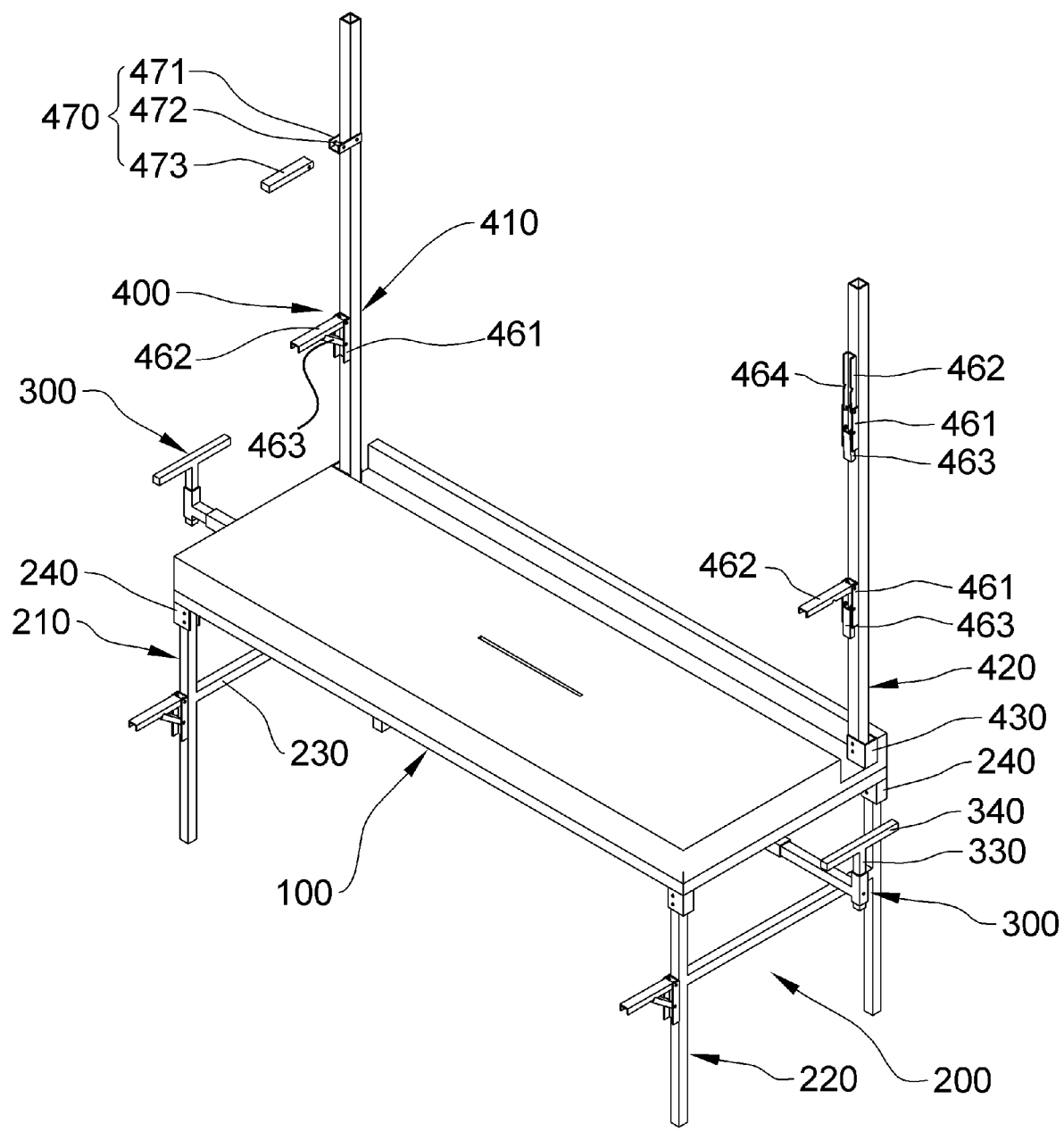
FIG. 2 is a perspective view illustrating a multipurpose cutter table according to a preferred embodiment of the present invention.
Figure 3:
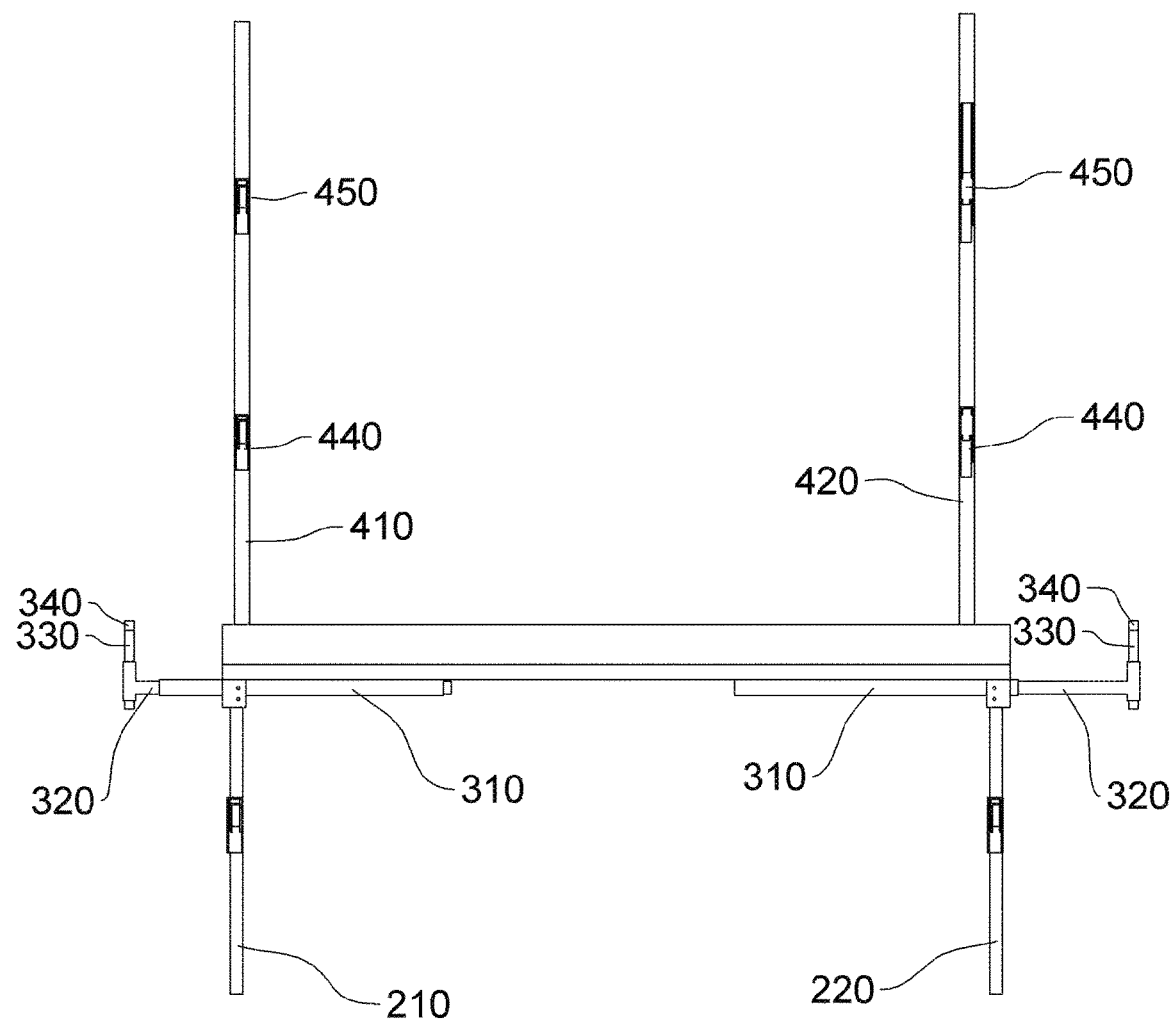
FIG. 3 is a front view illustrating a multipurpose cutter table according to a preferred embodiment of the present invention.
Figure 4:
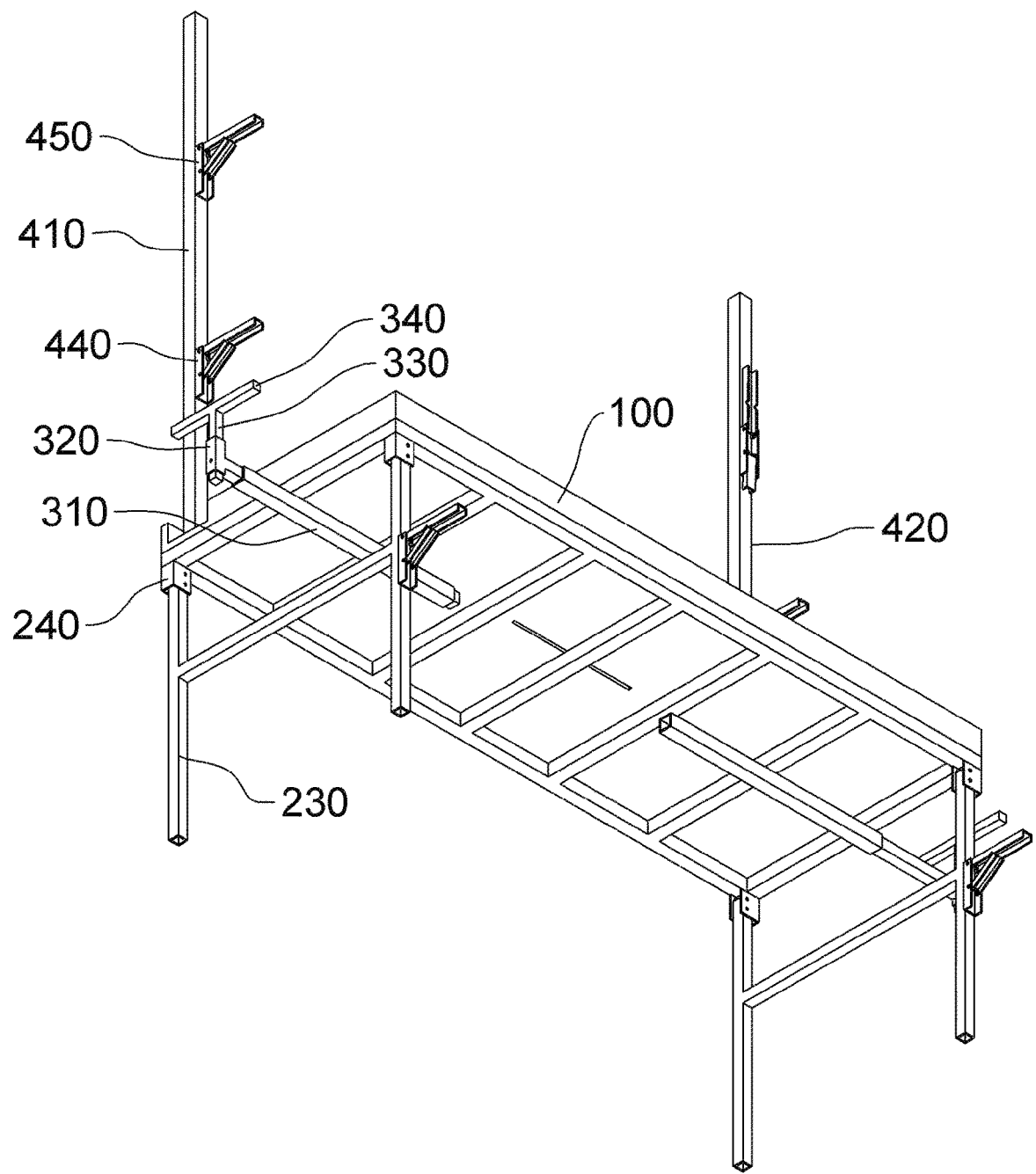
FIG. 4 is a bottom perspective view illustrating a multipurpose cutter table according to a preferred embodiment of the present invention.
Figure 5:
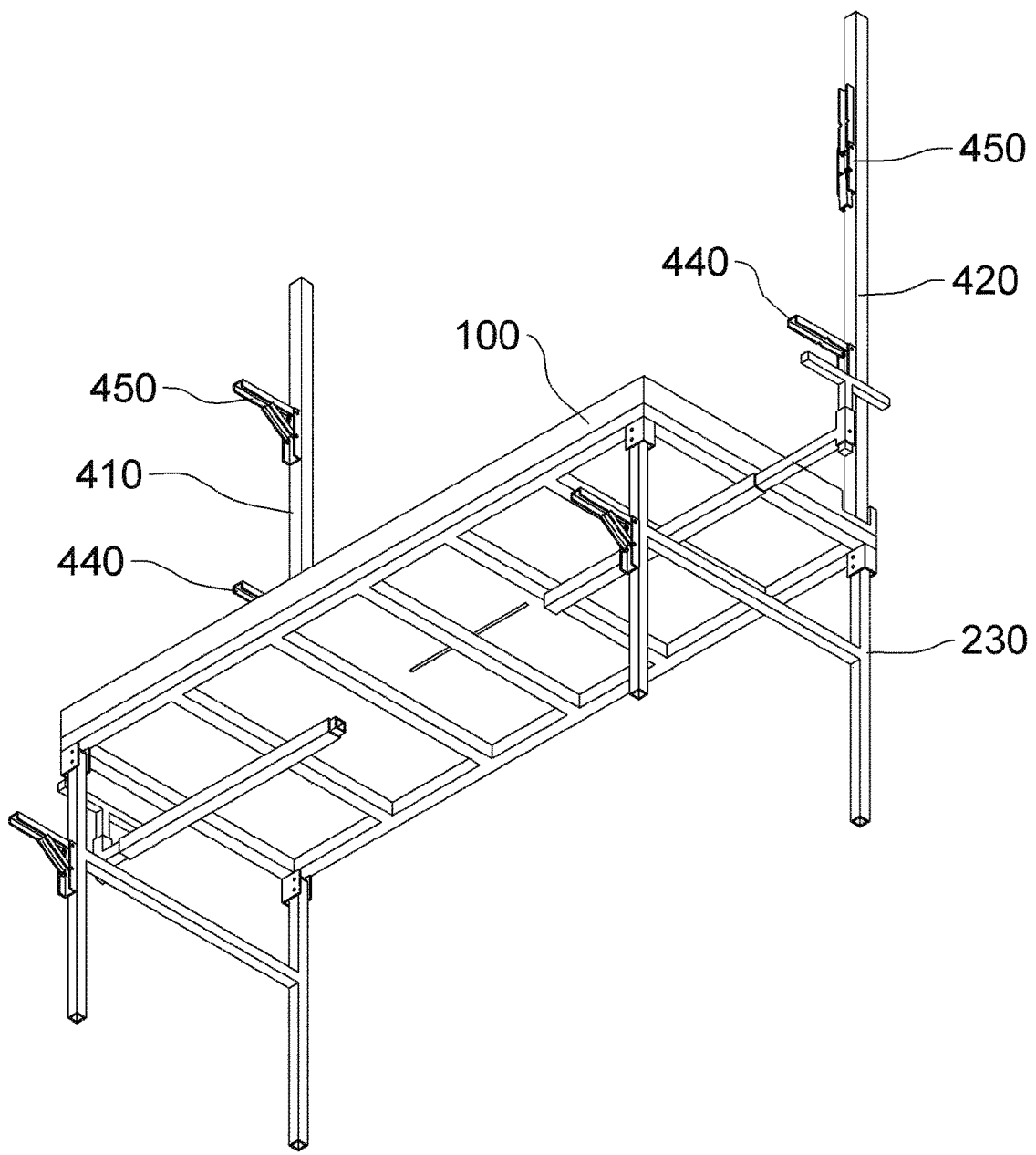
FIG. 5 is a bottom perspective view illustrating a multipurpose cutter table according to a preferred embodiment of the present invention.

FIG. 1 is a perspective view illustrating a multipurpose cutter table according to a preferred embodiment of the present invention. FIG. 2 is a perspective view illustrating a multipurpose cutter table according to a preferred embodiment of the present invention. FIG. 3 is a front view illustrating a multipurpose cutter table according to a preferred embodiment of the present invention. FIG. 4 is a bottom perspective view illustrating a multipurpose cutter table according to a preferred embodiment of the present invention. FIG. 5 is a bottom perspective view illustrating a multipurpose cutter table according to a preferred embodiment of the present invention.

As shown in FIGS. 1 to 5, the table member 100 is formed in a predetermined size, and a long hole 101 having a predetermined length is formed so that a saw blade (not shown) is installed to protrude from an upper surface of the table member 100 in a center of the table member 100.

The leg members 200 may include: a first leg member 210 supporting one side of the table member 100; and a second leg member 220 supporting the other side of the table member 100, wherein each of the first leg member 210 supporting and the second leg member 220 includes: a vertical frame 230 formed in an H shape; and a fixed frame 240 fixed to a bottom surface of the table member 100 so as to be folded or unfolded by rotating the vertical frame 230.

The leg member 200 supports the table member 100. The first leg member 210 is installed on one side of a bottom surface of the table member 100, and the second leg member 210 is installed on the other side of the bottom surface of the table member 100.

The first leg member 210 and the second leg member 220 have the same structure, and each of the first leg member 210 supporting and the second leg member 220 includes a vertical frame 230 formed in an H shape and a fixed frame 240 fixed to the bottom surface of the table member 100.

The vertical frame 230 is rotatably installed with respect to the fixed frame 240 and is formed in an 'H' shape to maintain rigidity of the table member 100 on which a weight is placed.

The fixed frame 240 is provided with holes to which a hinge is coupled so that the vertical frame 230 can be folded or unfolded, and the holes are formed to be spaced apart from each other by a predetermined height.

That is, a first hinge hole to which a hinge is coupled so as to rotate the vertical frame 230 is formed on the upper portion of the fixed frame 240, and a second hinge hole to which a hinge is coupled to maintain a state in which the vertical frame 230 stands vertically is formed. The second hinge hole is formed to be spaced apart from the first hinge hole in a lower portion of the first hinge hole by a predetermined height.

By detachably coupling a hinge or a fixing pin to the second hinge hole, the first leg member 210 and the second leg member 220 can be folded or unfolded vertically.

Figure 6:
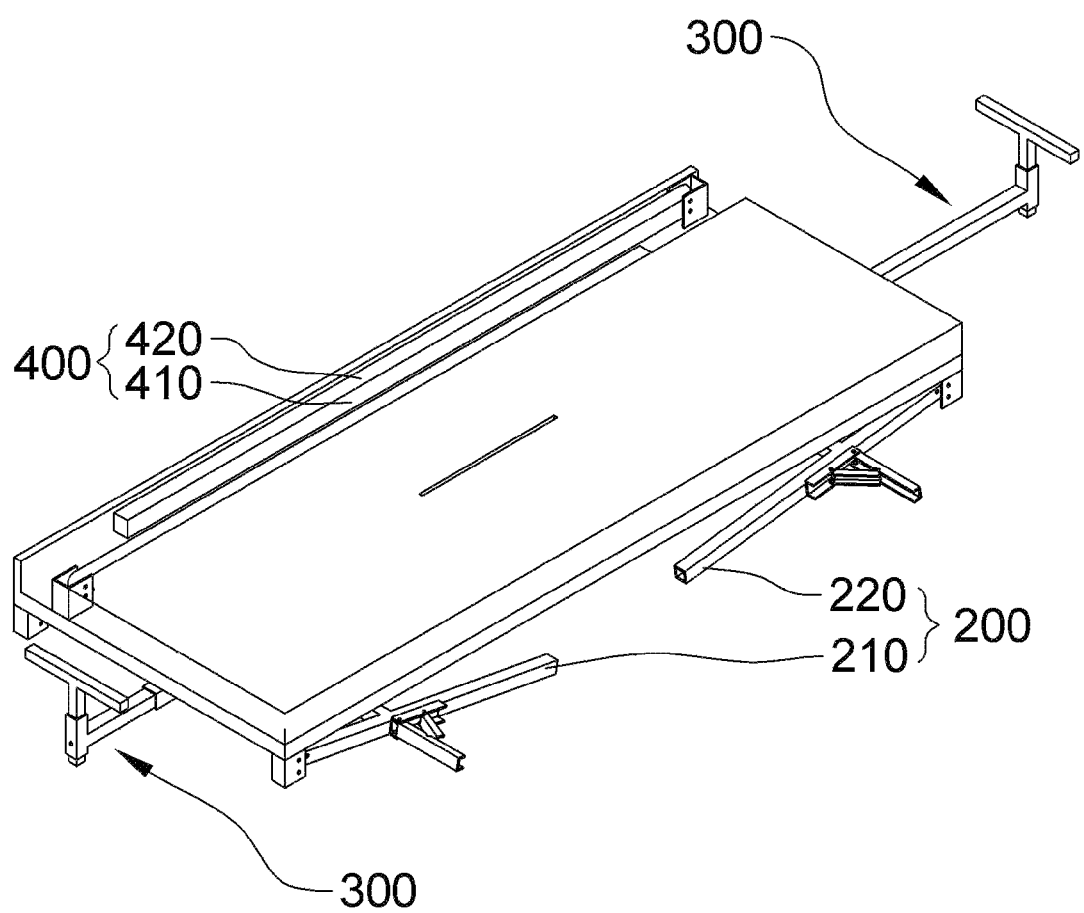
FIG. 6 is a perspective view illustrating a folded state of the multipurpose cutter table according to a preferred embodiment of the present invention.
Figure 7:
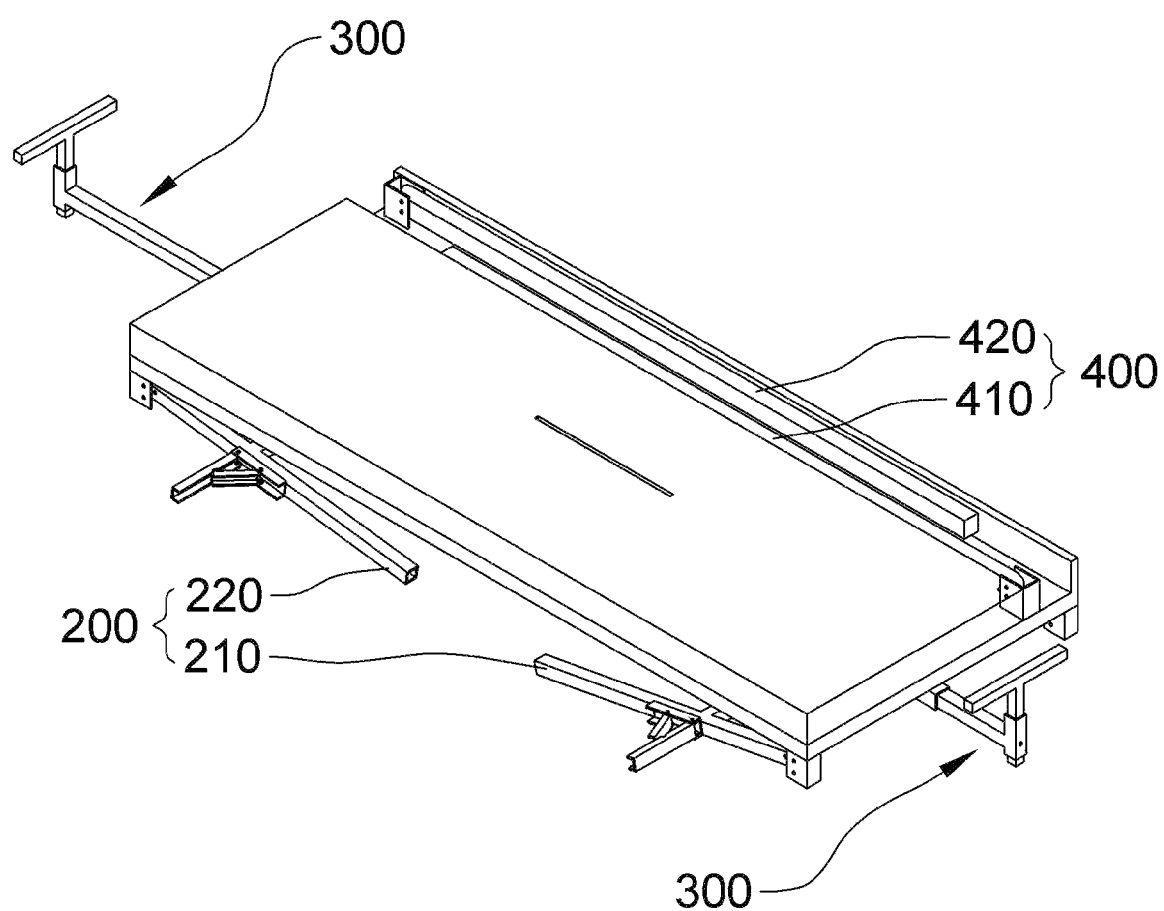
FIG. 7 is a perspective view illustrating a folded state of the multipurpose cutter table according to a preferred embodiment of the present invention.
Figure 8:
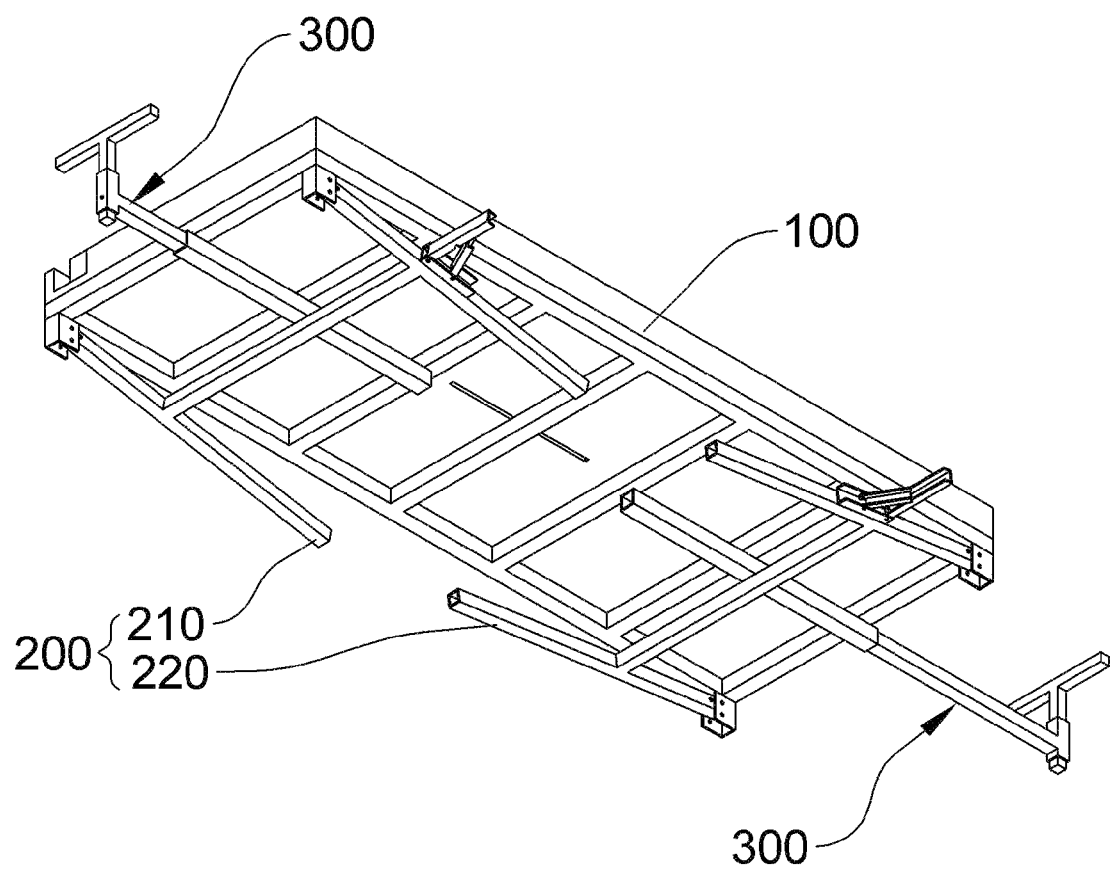
FIG. 8 is a bottom perspective view illustrating a folded state of the multipurpose cutter table according to a preferred embodiment of the present invention.
Figure 9:
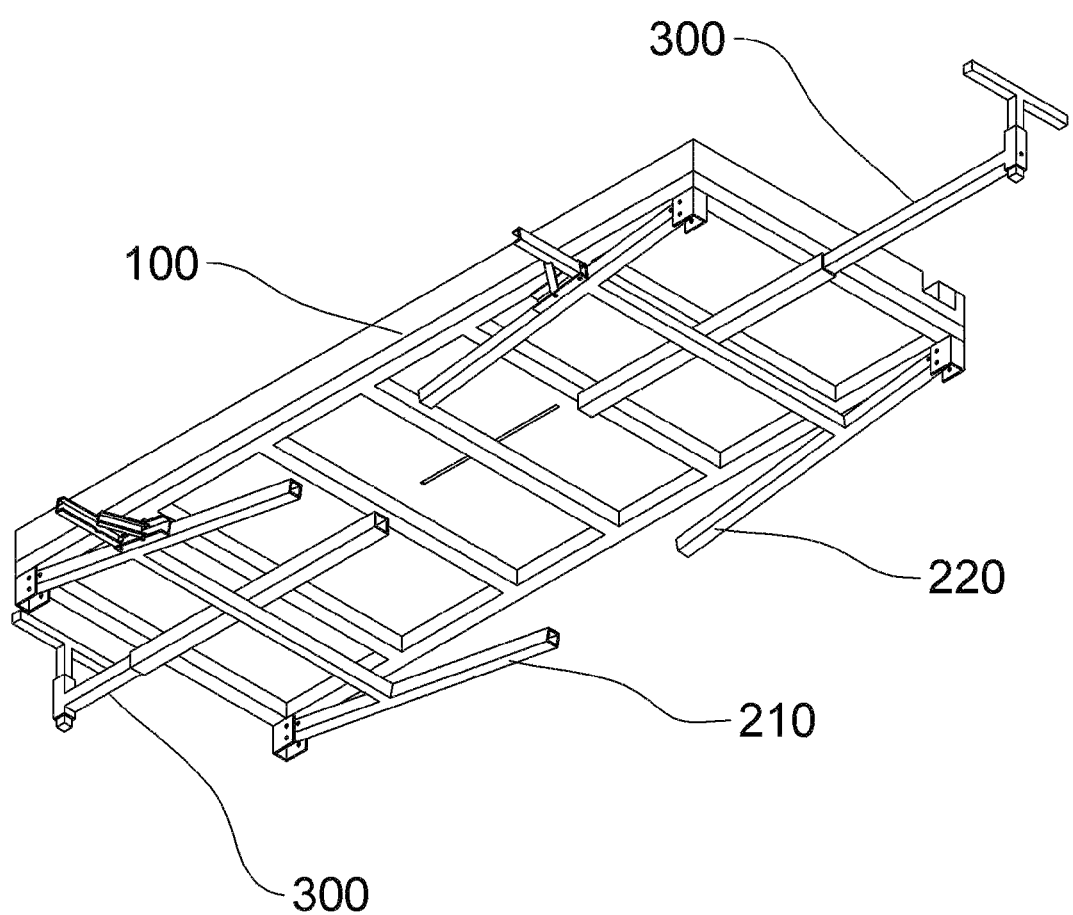
FIG. 9 is a bottom perspective view illustrating a folded state of the multipurpose cutter table according to the preferred embodiment of the present invention.

FIG. 6 is a perspective view illustrating a folded state of the multipurpose cutter table according to a preferred embodiment of the present invention. FIG. 7 is a perspective view illustrating a folded state of the multipurpose cutter table according to a preferred embodiment of the present invention. FIG. 8 is a bottom perspective view illustrating a folded state of the multipurpose cutter table according to a preferred embodiment of the present invention. FIG. 9 is a bottom perspective view illustrating a folded state of the multipurpose cutter table according to the preferred embodiment of the present invention.

As shown in FIGS. 4 to 9, the side supporting members 300 supporting the cutting object are installed on both sides of the bottom surface of the table member 100.

The side supporting member 300 includes: a quadrangle frame 310 fixed to the bottom surface of the table member 100; a horizontal moving frame 320 coupled to be horizontally movable along an inner surface of the quadrangle frame 310; a vertical moving frame 330 coupled to a front end of the moving frame 320 in a vertical direction and movably coupled to the moving frame 320 in a vertical direction; and a horizontal fixed frame 340 fixed to an upper surface of the vertical moving frame 330 in a direction crossing the horizontal moving frame 320 so that the cutting object can be placed thereon.

The side supporting members 300 are variably extended to both sides of the table member 100 and installed on the bottom surface of the table member 100.

As the side supporting members 300 are drawn from an outer edge of the table member 100, a long cutting object can be stably placed on the table member 100. In case of a short cutting object mounted on the upper surface of the table member 100, the side supporting members 300 are pushed into the bottom surface of the table member 100.

The quadrangle frame 310 having a predetermined length is fixed to the bottom surface of the table member 100, and the quadrangle frame 310 is formed in a hollow shape.

In addition, the horizontal moving frame 320 having a predetermined length is movably coupled to an inner portion of the quadrangle frame 310, and a length of the horizontal moving frame 320 is formed to be longer than that of the quadrangle frame 310.

Furthermore, the vertical moving frame 330 supporting the cutting object is installed at a front end of the horizontal moving frame 320. The vertical moving frame 330 is adjustable in height at the front end of the horizontal moving frame 320 and is formed in an approximately 'T' shape.

The vertical moving frame 330 is adjusted upward or downward according to a size and a height of the cutting object.

That is, the vertical moving frame 330 is coupled to the front end of the horizontal moving frame 320 at a right angle, and the horizontal fixed frame 340 is fixed to the upper end of the vertical moving frame 330 in a horizontal direction.

The upper surface supporting member 400 includes: a first vertical member 410 installed on one side of the table member 100; a second vertical member 420 installed on the other side of the table member 100; a hinge member 430 installed on the upper surface of the table member 100 so that the first vertical member 410 and the second vertical member 420 are rotatably installed thereon; a first horizontal member 440 installed so as to be adjustable in height to be at a predetermined height of the first vertical member 410 and the second vertical member 420; and a second horizontal member 450 installed so as to be adjustable in height above an upper portion of the first horizontal member 440.

The upper surface supporting member 400 is installed to stably place the cutting object or cutting tools.

The upper surface supporting member 400 includes a first vertical member 410 installed on one side of the table member 100 and a second vertical member 420 installed on the other side of the table member 100.

The first vertical member 410 and the second vertical member 420 are rotatably installed. During operation, the first vertical member 410 and the second vertical member 420 are maintained in a vertical standing state, and they are folded to facilitate storage and transport.

Hinge members 430 are fixed to both sides of the upper surface of the table member 100, respectively, and the hinge member 430 is formed in an approximately 'C' shape when viewed in a plan view.

In addition, a hinge hole is formed in the hinge member 430 to be spaced apart by a predetermined height. The hinge hole may be a plurality of hinge holes including a first hinge hole allowing the first vertical member 410 and the second vertical member 420 to be rotatably coupled, and a second hinge fixing the first vertical member 410 and the second vertical member 420.

In addition, the first horizontal member 440 and the second horizontal member 450 are respectively installed on the first vertical member 410 and the second vertical member 420 so that a plate (not shown) such as a shelf can be placed thereon.

The first horizontal member 440 is installed on a lower portion of each of the first vertical member 410 and the second vertical member 420, and the second horizontal member 450 is installed on an upper portion of the first vertical member 410 and the second vertical member 420, which is higher than a position of the first horizontal member 440.

A pair of the first horizontal members 440 enables a plate (not shown) to be installed thereon, thereby allowing a user to place a material, tools, and a cutting object thereon and use them, and the second horizontal member 450 also enables a plate (not shown) to be installed thereon, thereby allowing the user to place the cutting object and use it.

Accordingly, it is possible to secure a sufficient working space during cutting operation in the table member 100, and to separate the cutting object before and after the cutting operation.

Meanwhile, the first horizontal member 440 and the second horizontal member 450 are rotatably installed.

Each of the first horizontal member 440 and the second horizontal member 450 includes: a fixed frame 461 fixed to a front surface of the first vertical member 410 and the second vertical member 420; a first rotating frame 462 that is rotatably installed on an upper portion of the fixed frame 461; and a second rotating frame 463 rotatably coupled to a lower portion of the fixed frame 461 and seated on a lower surface of the first rotating frame 462.

The fixed frame 461 is fixed to the first vertical member 410 and the second vertical member 420, the first rotating frame 462 is rotatably installed on a lower portion of the fixed frame 461, and the second rotating frame 463 is rotatably installed on the upper portion of the fixed frame 461.

In addition, a fixing groove 464 is formed in the first rotating frame 462 to be supported by the second rotating frame 463.

Meanwhile, according to FIG. 2, an upper surface supporting member 470 according to another embodiment is shown. The upper surface supporting member 470 is configured in such a way that a first fixed frame 471 is fixed to an upper portion of the first vertical member 410, and a second fixed frame 473 is rotatably coupled to a hinge 472 provided on the first fixed frame 471.

In addition, the first fixed frame 471 is provided with a hinge 472, and the hinge 472 is provided with a second fixed frame 473 having a predetermined length. The second fixed frame 473 is rotatably coupled to the hinge 472.

Next, a method of operating the multipurpose cutter table according to a preferred embodiment of the present invention will be described with reference to FIGS. 1 to 9.

As shown in FIGS. 1 to 9, the multipurpose cutter table of the present invention is installed by rotating the leg member 200 installed on the bottom surface of the table member 100 and standing it vertically.

In addition, when the length of a cutting object is long, the side supporting members 300 respectively installed on both sides of the table member 100 are drawn outwardly. Accordingly, the cutting object longer than the length of the table member 100 can be stably placed on the table member 100.

Furthermore, since the vertical moving frame 330 of the side supporting member 300 is installed to be adjustable in height on the horizontal moving frame 320, the height of the horizontal fixed frame 340 can be freely adjusted according to the cutting object.

The upper surface supporting member 400 enables the cutting object to be stably placed thereon. Accordingly, it is possible to put the cutting object before and after cutting during the cutting operation.

Therefore, an additional workspace can be obtained other than the table member 100.

Meanwhile, since the leg member 200 and the upper surface supporting member 400 can be folded or unfolded with respect to the fixed frame 240 and the hinge member 430, the cutter table can be stored easily when not in use.

In addition, since the side supporting member 300 can be pushed toward a center of the table member 100, the cutter table can be further easily stored.

Although the invention made by the present inventor has been described in detail according to the above embodiments, the present invention is not limited to the embodiments described above, and various modifications can be made without departing from the gist of the present invention.

What is claimed is:

1. A multipurpose cutter table comprising:
    a table member having a long hole, the long hole being configured to install a saw blade;
    a pair of leg members that are foldably installed on a bottom surface of the table member 100 and support the table member;
    a pair of side supporting members installed so as to be adjustable in length on both sides of the table member and to support a cutting object on both sides of the table member; and
    an upper surface supporting member that is foldably installed on an upper surface of the table member and installed so that the cutting object is placed on the upper surface of the table member,
    wherein the upper surface supporting member includes:
    a first support member installed on one side of the table member;
    a second support member installed on the other side of the table member;
    a pair of hinge members installed on the upper surface of the table member so that the first support member and the second support member are pivotally installed thereon, respectively;
    a pair of first side members installed on the first support member and the second support member, respectively so as to be adjustable in height to be at a predetermined height of the first support member and the second support member, respectively; and
    a pair of second side members installed on the first support member and the second support member, respectively so as to be adjustable in height above an upper portion of the first side members, respectively,
    wherein each of the first side members and the second side members include:
    base frames mounted to a front surface of the first support member and a front surface of the second support member;
    first pivoting frames that are rotatably installed on upper portions of the base frames, respectively; and
    second pivoting frames pivotally coupled to lower portions of the base frames and configured to be seated on a lower surfaces of the first pivoting frames.

2. The multipurpose cutter table of claim 1, wherein the leg members includes:
    a first leg member supporting one side of the table member; and
    a second leg member supporting the other side of the table member, wherein each of the first leg member and the second leg member includes:
    a support frame formed in an H shape; and
    a first fixed frame fixed to a bottom surface of the table member so as to be folded or unfolded by pivoting the support frame.

3. The multipurpose cutter table of claim 1, wherein the side supporting member includes:
    a quadrangle frame fixed to a bottom surface of the table member;
    a first movable frame coupled to be movable along an inner surface of the quadrangle frame;
    a second movable frame coupled to a front end of the first movable frame in a perpendicular direction and movably coupled to the first movable frame in the perpendicular direction; and
    a second fixed frame fixed to an upper surface of the second movable frame in a direction crossing the first movable frame so that the cutting object can be placed thereon.

* * * * *